(12) United States Patent
Taylor (10) Patent No.: US 6,799,597 B1
(45) Date of Patent: Oct. 5, 2004

(54) PRESSURE CONTROL SYSTEM WHICH DETECTS AND ABATES OVERPRESSURE AND UNDERPRESSURE CONDITIONS IN A PRESSURIZED FLUID

(75) Inventor: Julian S. Taylor, Oklahoma City, OK (US)

(73) Assignee: Taylor Innovations, L.L.C., Oklahoma City, OK (US)

(*) Notice: Subject to any disclaimer, the term of this patent is extended or adjusted under 35 U.S.C. 154(b) by 18 days.

(21) Appl. No.: 10/295,216

(22) Filed: Nov. 15, 2002

(51) Int. Cl.[7] .............................................. F16K 17/40
(52) U.S. Cl. ..................... 137/71; 137/458; 137/624.27; 251/89; 251/297
(58) Field of Search ............................... 137/67, 68.11, 137/71, 458, 624.27; 251/89, 297

(56) References Cited

U.S. PATENT DOCUMENTS

| | | | |
|---|---|---|---|
| 2,733,729 A | * 2/1956 | Wolfe | ......................... 137/458 |
| 3,042,057 A | * 7/1962 | Zorgdrager et al. | ........... 137/70 |
| 3,542,052 A | 11/1970 | Irwin | |
| 4,724,857 A | 2/1988 | Taylor | |
| 4,977,918 A | * 12/1990 | Taylor | ......................... 137/70 |
| 5,067,511 A | 11/1991 | Taylor | |
| 5,209,253 A | * 5/1993 | Taylor | ......................... 137/67 |
| 5,226,442 A | * 7/1993 | Taylor | ......................... 137/70 |
| 5,297,575 A | 3/1994 | Taylor | |
| 5,433,239 A | 7/1995 | Taylor | |
| 5,685,329 A | 11/1997 | Taylor | |
| 6,155,284 A | 12/2000 | Scantlin | |

* cited by examiner

*Primary Examiner*—Ramesh Krishnamurthy
(74) *Attorney, Agent, or Firm*—Fellers, Snider, et al.

(57) ABSTRACT

Apparatus for detecting and abating an overpressure condition and an underpressure condition in a pressurized fluid. A collapsible buckling pin is supported between a valve assembly and a control assembly. The control assembly comprises a retractable support member moveable between an extended position and a retracted position. A biasing member applies a retraction force to urge the support member to the retracted position. A compressive force is applied to the pin by the valve assembly in relation to a pressure of the fluid, and this force nominally retains the support member in the extended position. When the pressure of the fluid exceeds an upper operational limit, the pin is mechanically deformed; conversely, when the pressure falls below a lower operational limit, the pin advances past the support member. In both cases the mechanical displacement of the pin allows the valve assembly to establish a secondary path for the fluid.

20 Claims, 5 Drawing Sheets

PRESSURE CONTROL SYSTEM WHICH DETECTS AND ABATES OVERPRESSURE AND UNDERPRESSURE CONDITIONS IN A PRESSURIZED FLUID

FIELD OF THE INVENTION

The present invention relates generally to pressurized fluid systems and more particularly; but not by way of limitation, to an apparatus which operates to establish a secondary path for a pressurized fluid when a pressure of the fluid falls above or below a selected operating pressure range.

BACKGROUND

Pressurized fluid systems are typically provided with pressure control and relief capabilities to prevent the possibility of injury to humans and damage to equipment in the event of an overpressure situation. Such pressure control systems often use a pressure responsive member such as a buckling pin that mechanically fails when subjected to a large increase in fluid pressure. Failure of the pressure responsive member allows a valve assembly to operate to establish an appropriate overpressure path for the fluid (such as by establishing a bypass path for the fluid or by shutting down a flow of the fluid).

While such systems typically operate to provide protection from overpressure conditions, there are also applications where it is desirable to detect and abate underpressure conditions as well. For example, a rupture in a pressurized pipeline or similar network can result in a sudden drop in system pressure as the fluid escapes to the external environment. In such a case it is desirable to activate a valve assembly to establish a secondary path for the fluid (such as an upstream shutoff valve which halts further flow of the fluid) until the rupture condition can be remediated.

There is therefore a continued need for improvements in the art to provide a pressure control system that operates when a pressure of a pressurized fluid falls outside a selected operating range, both above the range in an overpressure context as well as below the range in an underpressure context. It is to such improvements that the present invention is directed.

SUMMARY OF THE INVENTION

The present invention is generally directed to detecting and abating an underpressure condition and an overpressure condition in a pressurized fluid.

In accordance with preferred embodiments, a pressure control system includes a collapsible buckling pin having an intermediate portion and opposing first and second ends. A valve assembly is coupled to the first end of the buckling pin and applies a compressive force to the buckling pin in relation to a pressure of the fluid.

The valve assembly respectively establishes a secondary path for the fluid when the pressure of the fluid exceeds an upper operational limit and when the pressure of the fluid falls below a lower operational limit. The secondary path is preferably a shut off path, but a bypass path can also be used as desired.

A control assembly is coupled to the second end of the buckling pin. The control assembly comprises a retractable support member moveable between an extended position and a retracted position. A biasing member applies a retraction force to the support member to urge the support member to the retracted position.

The compressive force applied to the buckling force generates a retention force between the second end of the pin and the support member to retain the support member in the extended position. The buckling pin thus remains supported between the valve assembly and the control assembly as long as the pressure is above the lower operational limit.

In the event of an overpressure condition in which the pressure of the fluid exceeds the upper operational limit, the intermediate portion of the buckling pin is mechanically deformed between the valve assembly and the support member. Conversely, in the event of an underpressure condition in which the pressure of the fluid falls below the lower operational limit, the retention force provided by the compression of the buckling pin is insufficient to overcome the retraction force of the biasing member.

The support member thus retracts to the retracted position and the second end of the buckling pin advances past the support member. In this way, the control assembly acts as a "trap door" to allow the buckling pin to be mechanically displaced without being mechanically deformed. In both cases (overpressure condition and underpressure condition), the mechanical displacement of the buckling pin allows the valve assembly to establish the shut off path.

These and various other features and advantages which characterize the claimed invention will become apparent upon reading the following detailed description and upon reviewing the associated drawings.

BRIEF DESCRIPTION OF THE DRAWINGS

FIG. 9 generally illustrates the system of FIG. 1 in response to an underpressure condition, with the support member in the retracted position and the buckling pin remaining in an uncollapsed state.

DETAILED DESCRIPTION

Figure 1:
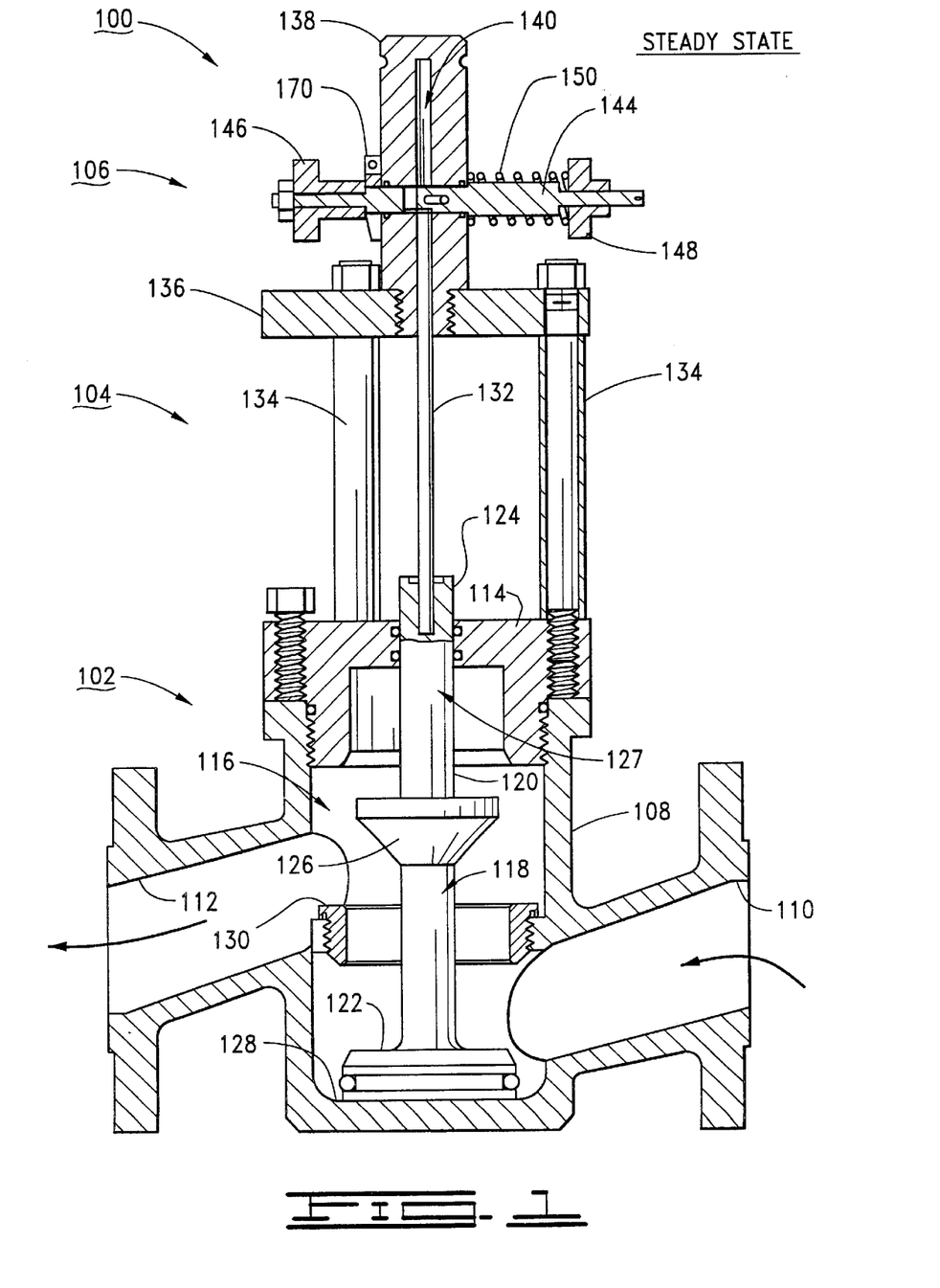
FIG. 1 is an elevational, partial cross-sectional view of a pressure control system constructed and operated in accordance with preferred embodiments of the present invention.

Reference is now made to FIG. 1 which shows a pressure control system 100 constructed in accordance with preferred embodiments of the present invention. The pressure control system 100 ("system") is used in conjunction with a pressurized fluid system (such as a pipeline network) in which a pressurized fluid is transported. The system 100 is shown in FIG. 1 to be in a steady state (normal operational) condition.

The system 100 includes a valve assembly 102, a pressure response assembly 104 and a low pressure control assembly 106. The valve assembly 102 includes a housing 108 with an inlet port 110 and an outlet port 112. A bonnet 114 threadingly engages the housing 108 to form an interior chamber 116.

A plunger assembly 118 is disposed within the interior chamber 116 of the housing 108. The plunger assembly 118 includes an elongated body portion 120. A piston 122 is affixed to a proximal end of the body portion 120 and a buckling pin support portion 124 is provided at a distal end of the body portion 120. The pin support portion 124 extends through an aperture in the bonnet 114. A bell flange 126 extends from an intermediary portion of the body portion 120.

The piston 122 is normally seated against an interior surface 128 of the housing 108. Pressurized fluid enters the inlet port 110, through the interior chamber 116 and out the outlet portion 112. The fluid impinges the plunger assembly 118 and imparts an axially directed force toward the pressure response assembly 104 in relation to the pressure of the pressurized fluid.

When the pressure of the pressurized fluid falls outside a selected operational range (i.e., an overpressure condition or an underpressure condition) the plunger assembly 118 advances upwardly and the piston 122 sealingly engages a valve seat 130 supported within the interior chamber 116 to shut off further flow of the fluid.

The pressure response assembly 104 of FIG. 1 includes a collapsible buckling pin 132 having a proximal end (first end) supported by the buckling pin support portion 124 of the plunger assembly 118 and a distal end (second end) supported by the control assembly 106. Standoffs 134 and support plate 136 of the pressure response assembly 104 maintain the desired spacing between the valve assembly 102 and the control assembly 106.

Figure 2:
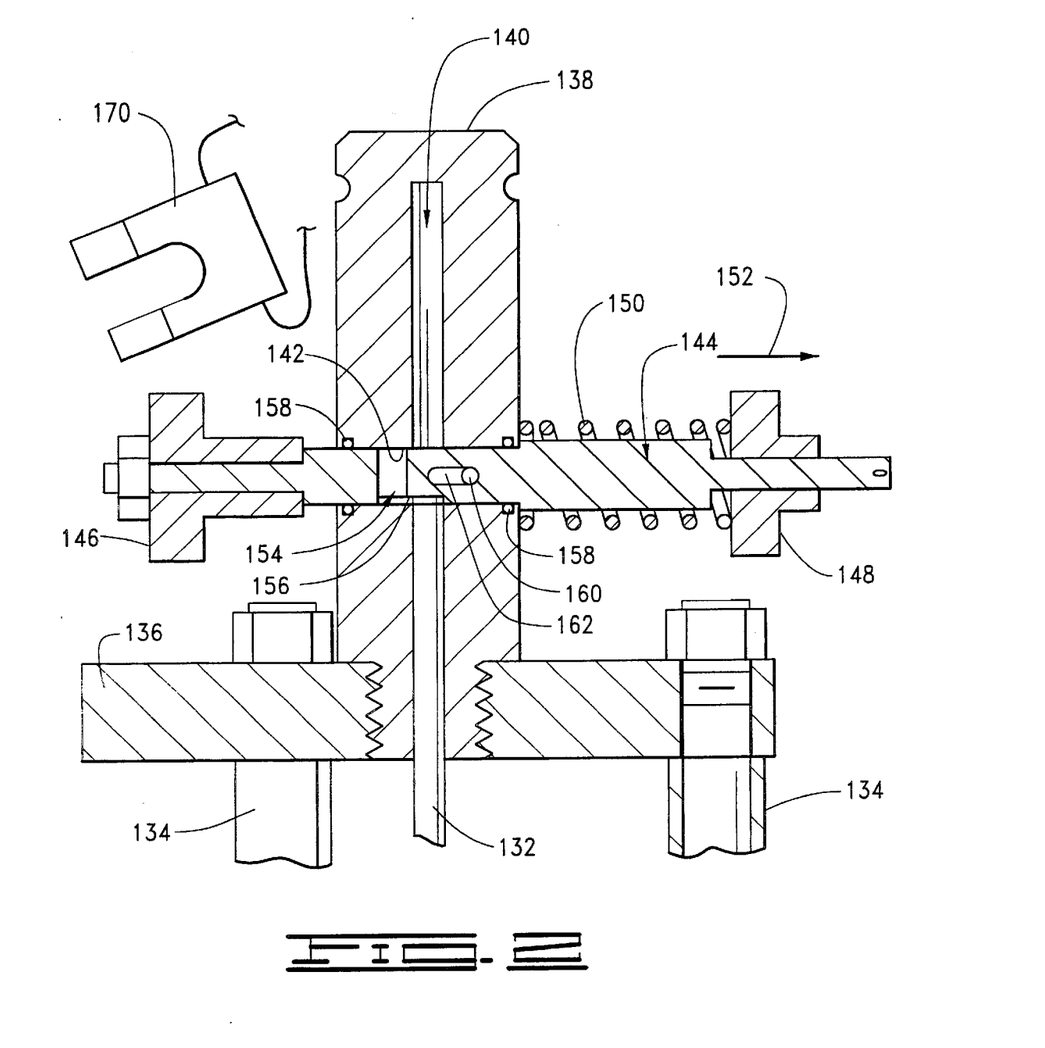
FIG. 2 shows relevant portions of the system of FIG. 1 in greater detail, including a support member which moves between an extended position and a retracted position during operation.
Figure 3:
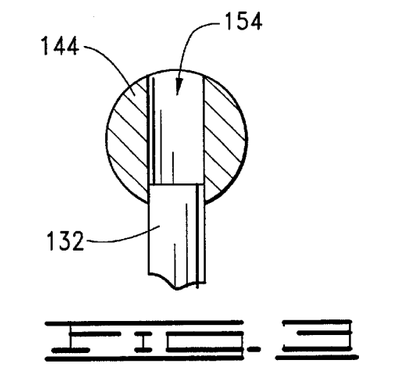
FIGS. 3 and 4 generally illustrate a preferred manner in which a distal end of a buckling pin of the system passes through a pin aperture of the support member in response to detection of an underpressure condition, with FIGS. 3 and 4 showing passage of the pin along an axial direction.

As shown in greater detail in FIG. 2, the control assembly 106 of FIG. 1 comprises a stationary body portion 138 which threadingly engages the support plate 136. The body portion 138 includes a substantially vertically extending pin channel 140 sized to slidingly receive the buckling pin 132. A substantially horizontally extending support member channel 142 intersects the pin channel 140.

The channel 142 receives a retractable, elongated support member 144 with opposing first and second ends. The support member 144 is moveable between an extended position (shown in FIG. 2) and a retracted position. A first limit stop member 146 is affixed to the first end of the support member 144, and a second limit stop member 148 is affixed to the second end of the support member 144.

A coiled spring 150 is disposed between the second limit stop member 148 and an exterior surface of the body portion 138. The spring 150 applies a spring force $F_S$ to the support member 144 to urge the support member 144 in a direction denoted by vector arrow 152 to the retracted position.

As further shown in FIGS. 3–6, the support member 144 includes a pin aperture 154 which extends through the support member 144. The pin aperture 154 includes a recessed shoulder surface 156 (also "support surface") which contactingly supports the distal end of the buckling pin 132.

With reference again to FIG. 1, the passage of fluid through the valve assembly 102 induces a vertically directed clamping force by the distal end of the buckling pin 132 onto the shoulder surface 156. This vertically directed clamping force, denoted as $F_C$, will generally result in a corresponding horizontally directed retention force $F_R$ upon the support member 144 in accordance with the following relationship:

$$F_R = \frac{F_C}{\mu} \tag{1}$$

where $\mu$ is the coefficient of friction between the distal end of the buckling pin 132 and the support surface 156. As long as the retention force $F_R$ exceeds the spring force $F_S$ induced by the spring 150, the support member 144 will remain in the orientation shown in FIGS. 1, 2, 3 and 5.

Figure 4:
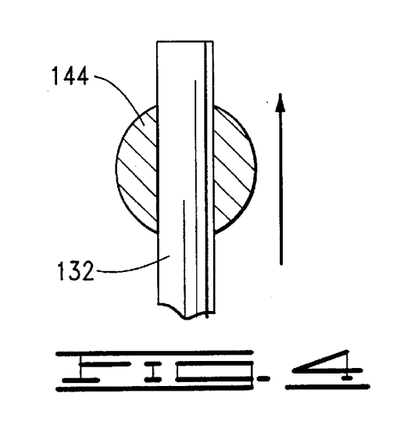
Figure 5:
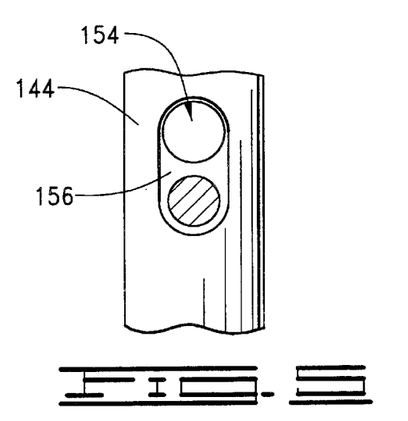
FIGS. 5 and 6 provide corresponding top plan views for FIGS. 3 and 4.
Figure 6:
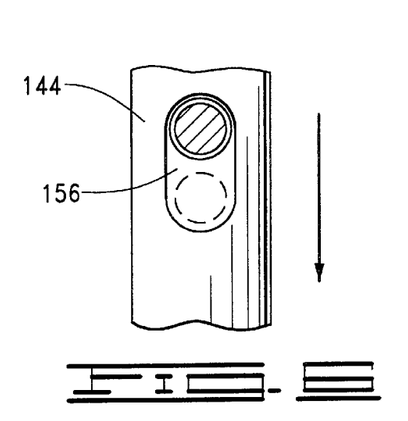

However, when the pressure of the fluid drops sufficiently so that $F_R$ is less than $F_S$, the spring 150 will retract the support member 144 and align the pin aperture 154 with the pin channel 140, as shown in FIGS. 4 and 6. This permits advancement of the distal end of the rupture pin 140 through the support member 144, which in turn allows the plunger assembly 102 to move the piston 122 into a seating engagement with the valve seat 130 and shut off further flow of the pressurized fluid.

Preferably, both the buckling pin 132 and the support member 144 are formed of stainless steel, resulting in a relatively low coefficient of frictiontherebetween (such as $\mu$=0.15). However, an intervening layer of material (such as vulcanized rubber) can be inserted between the pin 132 and the support surface 156 to provide a higher coefficient of friction, as desired.

Figure 7:
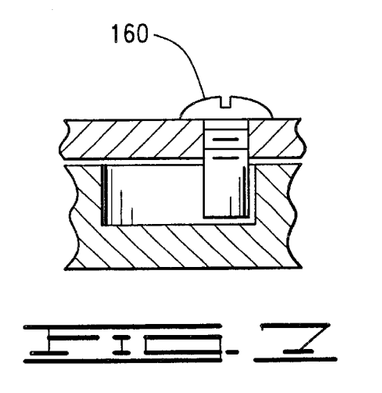
FIGS. 7 and 8 generally illustrate a preferred manner of keying the support member to maintain desired alignment between the buckling pin and the pin aperture.
Figure 8:
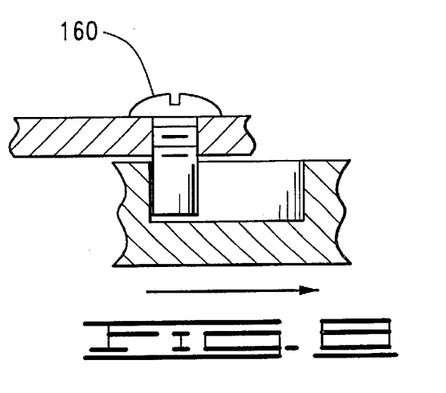

The support member 144 has a substantially circular cross-sectional configuration to facilitate sealing of the support member 144 with seals 158 and to obtain consistent retraction operation over time. To prevent misregistration of the pin aperture 154 with the pin channel 140 due to the inadvertent rotation (twisting) of the support member 144 within the support body 138, the support member 144 is keyed by an alignment pin 160. As further shown in FIGS. 7 and 8, the pin 160 extends through the support body 138 and into a slot 162 formed in the support member 144. Other keying configurations are readily envisioned, however.

Figure 10:
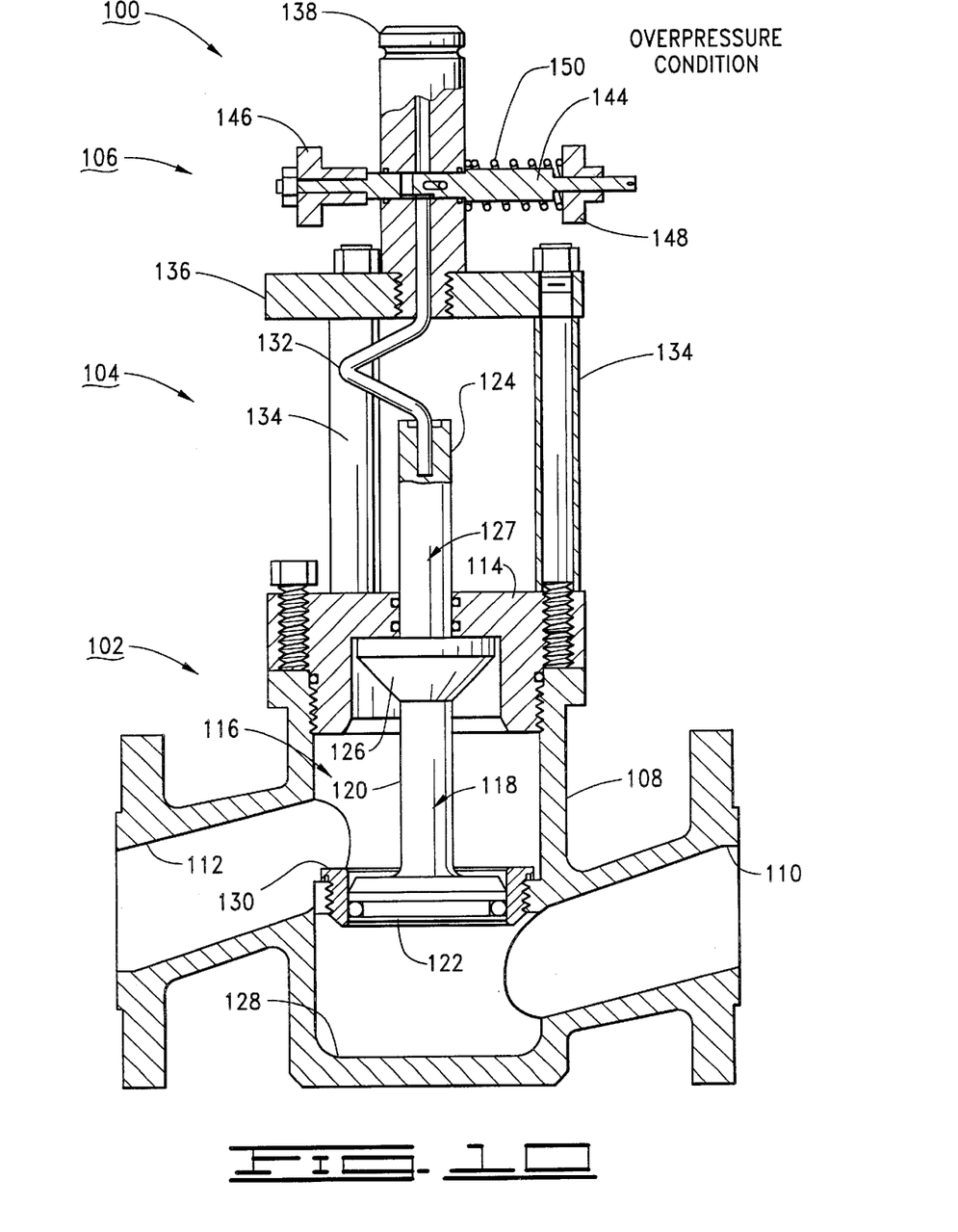
FIG. 10 generally illustrates the system of FIG. 1 in response to an overpressure condition, with the support member in the extended position and the buckling pin in a collapsed (mechanically deformed) state.

FIG. 9 shows the system 100 of FIG. 1 in response to an underpressure condition. It will be observed that the control assembly 106 generally acts as a "trap door" to permit advancement of the buckling pin 132 past the support member 144 without mechanical deformation of the pin 132. Conversely, FIG. 10 shows the system in response to an overpressure condition. The fluidic pressure in FIG. 9 increased sufficiently to induce controlled mechanical failure (buckling) of the pin 132 in accordance with Euler's law. In both cases the mechanical displacement of the buckling pin 132 allows the valve assembly 102 to shut off further flow of the pressurized fluid.

The range of operation of the system 100 will depend on several factors and will be dictated by the requirements of a given application. The upper set point (upper operational limit) at which failure of the pin 132 occurs will be generally determined by the respective geometries of the valve assembly 102 and the buckling pin 132. The lower set point (lower operational limit) at which the support member 144 retracts will be generally determined by the geometry of the valve assembly 102, the coefficient of friction between the pin 132 and the support member 144, and the tension of the spring 150.

In order to provide a concrete example, the system 100 can be adapted to transport high pressure natural gas at a nominal pressure of around 1500 pounds per square inch (psi). The upper set point will be selected to be a suitable value such as 1800 psi. The lower set point can be any suitable, abnormally low value such as 100 or 500 psi.

The upper set point will have a relatively tight activation tolerance range (e.g., ±1.5%) based on the controlled characteristics of the buckling pin 132. The lower set point may tend to have a wider activation tolerance range (e.g., ±10%) depending upon the mechanical configuration of the control assembly 106.

Such lower set point variability is not deemed to be a problem in most cases, since it is contemplated that significant underpressure conditions will often be characterized as an abrupt drop in system pressure to a significantly lower level (e.g., a drop from 1500 psi to below 500 psi). The steep gradient associated with such a pressure drop means that, even with a relatively large variation in the lower set point, the valve assembly 102 will still react in a relatively short time to shut off the flow of the fluid.

It is contemplated that the energy of the fluid, even at such a lower pressure, will still be sufficient to close the valve assembly 102. However, it is contemplated that the system 100 can further be provided with a second biasing member such as a second spring to provide the plunger assembly 118 with an upwardly directed bias force. The second biasing member would ensure that the piston 122 fully seats against the valve seat 130 in response to a loss of system pressure.

Although the valve assembly 102 has been described herein as a normally open (NO) valve, it will be readily understood that a normally closed (NC) valve configuration can be readily used as well. Also, the system 100 can be readily modified to employ other valve configurations including ball valves and butterfly valves.

A U-shaped lock-out wedge 170 (shown in FIGS. 1 and 2) advantageously allows the system 100 to be armed (i.e., placed into the steady state condition of FIG. 1). As shown in FIG. 1, the spring 150 is compressed and the wedge 170 is inserted between the first end stop 146 and the body portion 138 prior to pressurization of the system. The wedge 170 acts as a spacer to retain the support member 144 in the armed position as the fluid pressure rises above the lower set point and reaches the selected operational range. After the system has been pressurized, the wedge 170 is removed as shown in FIG. 2.

In view of the foregoing, it will now be understood that the present invention is generally directed to detecting and abating an underpressure condition and an overpressure condition in a pressurized fluid. In accordance with preferred embodiments, a pressure control system (such as 100) includes a collapsible buckling pin (such as 132) having an intermediate portion and opposing first and second ends.

A valve assembly (such as 102) is coupled to the first end of the buckling pin and applies a compressive force to the buckling pin in relation to a pressure of the fluid. The valve assembly respectively establishes a secondary path for the fluid when the pressure of the fluid exceeds an upper operational limit and when the pressure of the fluid falls below a lower operational limit. The secondary path is preferably a shut off path, but a bypass path can also be used as desired.

The pressure control system further comprises a control assembly (such as 106) coupled to the second end of the buckling pin. The control assembly comprises a retractable support member (such as 144) moveable between an extended position (see FIG. 1) and a retracted position (see FIG. 9). A biasing member (such as the spring 150) applies a retraction force to the support member to urge the support member to the retracted position.

The intermediate portion of the buckling pin is mechanically deformed between the valve assembly and the support member when the pressure of the fluid exceeds the upper operational limit (as shown in FIG. 10). Conversely, the support member retracts to the retracted position to allow the second end of the buckling pin to advance adjacent the support member when the pressure of the fluid falls below the lower operational limit (as shown in FIG. 9). In both cases, the mechanical displacement of the buckling pin allows the valve assembly to establish the shut off path.

Preferably, the support member comprises a support surface (such as 156) which pressingly contacts the second end of the buckling pin, so that the compressive force upon the buckling pin induces a retention force upon the support surface which counteracts the retraction force of the biasing member to retain the support member in the extended position when the pressure of the fluid is above the lower operational limit. The retention force is preferably established in relation to a coefficient of friction between the second end of the buckling pin and the support surface.

The support member further preferably comprises a pin aperture (such as 154) adjacent the support surface, so that the second end of the buckling pin slides across the support surface and into the pin aperture as the support member moves from the extended position to the retracted position.

Preferably, the valve assembly comprises a housing (such as 108) and a plunger assembly (such as 118) disposed within the housing, the plunger assembly having a piston (such as 122) disposed at a first end and a pin support portion (such as 124) disposed at a second end of the plunger assembly, with the pin support portion supporting the first end of the buckling pin.

The valve assembly further preferably comprises a valve seat (such as 130) supported within the housing, wherein the plunger assembly advances to seat the piston in a sealing engagement with the valve seat when the buckling pin is mechanically deformed and when the second end of the buckling pin advances adjacent the support member.

Further, the control assembly preferably comprises a keying member (such as alignment pin 160 and slot 162) which maintains desired alignment of the support member with the body portion as the support member moves from the extended position to the retracted position.

For purposes of the apppended claims, the recited first means will be understood to correspond to the disclosed spring 150 which establishes a retraction force upon the support member 144 by applying a spring force between the outer surface of the body portion 138 and the second end limit stop 148. Any number of other mechanical configurations that apply a retention force to urge the support member to the retracted position are contemplated.

The secondary path for the pressurized fluid will be understood to comprise a shut off path as disclosed herein as well as a bypass path for the fluid. Description of the valve assembly respectively establishing the secondary path will be understood consistent with the foregoing discussion as occuring as a result of either the collapse of the buckling pin 132 or advancement of the buckling pin 132 "through the trap door" of the support member 144.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A pressure control system for detecting and abating an underpressure condition and an overpressure condition in a pressurized fluid, comprising:

a collapsible buckling pin having an intermediate portion and opposing first and second ends;

a valve assembly coupled to the first end of the buckling pin and which applies a compressive force to the buckling pin in relation to a pressure of the fluid, wherein the valve assembly respectively establishes a secondary path for the fluid when the pressure of the fluid exceeds an upper operational limit and when the pressure of the fluid falls below a lower operational limit; and a control assembly coupled to the second end of the buckling pin and comprising a retractable support member moveable between an extended position and a retracted position and first means for applying a retraction force to the support member to urge the support member to the retracted position, wherein the intermediate portion of the buckling pin is mechanically deformed between the valve assembly and the support member when the pressure of the fluid exceeds the upper operational limit, and wherein the support member retracts to the retracted position to allow the second end of the buckling pin to advance adjacent the support member when the pressure of the fluid falls below the lower operational limit.

2. The pressure control system of claim 1, wherein the support member comprises a support surface which pressingly contacts the second end of the buckling pin, and wherein the compressive force upon the buckling pin induces a retention force upon the support surface which counteracts the retraction force of the first means to retain the support member in the extended position when the pressure of the fluid is above the lower operational limit.

3. The pressure control system of claim 2, wherein the retention force is established in relation to a coefficient of friction between the second end of the buckling pin and the support surface.

4. The pressure control system of claim 2, wherein the support member further comprises a pin aperture adjacent the support surface, and wherein the second end of the buckling pin slides across the support surface and into the pin aperture as the support member moves from the extended position to the retracted position.

5. The pressure control system of claim 1, wherein the valve assembly comprises a housing and a plunger assembly disposed within the housing, the plunger assembly having a piston disposed at a first end and a pin support portion disposed at a second end of the plunger assembly, the pin support portion supporting the first end of the buckling pin.

6. The pressure control system of claim 5, wherein the valve assembly further comprises a valve seat supported within the housing, wherein the plunger assembly advances to seat the piston in a sealing engagement with the valve seat when the buckling pin is mechanically deformed and when the second end of the buckling pin advances adjacent the support member.

7. The pressure control system of claim 1, wherein the valve assembly is characterized as a normally open (NO) valve so that secondary path comprises a shut off of further flow of the fluid.

8. The pressure control system of claim 1, wherein the valve assembly is characterized as a normally closed (NC) valve so that the secondary path comprises a bypass path for the fluid.

9. The pressure control system of claim 1, wherein the control assembly further comprises a body portion through which the support member extends, the body portion having a pin aperture axially aligned with the buckling pin so that, when the support member is moved to the retracted position, the second end of the buckling pin extends into the pin aperture of the body portion.

10. The pressure control system of claim 9, wherein the control assembly further comprises a keying member which maintains desired alignment of the support member with the body portion as the support member moves from the extended position to the retracted position.

11. The pressure control system of claim 1, wherein the first means comprises a spring.

12. The pressure control system of claim 1, wherein the pressure of the fluid causes the valve assembly to respectively establish the secondary path after the buckling pin mechanically deforms and after the support member retracts to the retracted position.

13. A control assembly for use in conjunction with a collapsible buckling pin and a valve assembly to detect and abate an underpressure condition and an overpressure condition in a pressurized fluid, the buckling pin having opposing first and second ends with the first end supported by the valve assembly, the control assembly comprising:

a body portion;

a retractable support member supported by the body portion and moveable between an extended position and a retracted position, wherein the support member supports the second end of the buckling pin while the support member is in the extended position; and a biasing member which applies a retraction force to the support member to urge the support member to the retracted position during operation, wherein the buckling pin is mechanically deformed between the valve assembly and the support member when the pressure of the fluid exceeds an upper operational limit, wherein the support member retracts to the retracted position to allow the second end of the buckling pin to advance adjacent the support member when the pressure of the fluid falls below a lower operational limit, and wherein the valve assembly establishes a secondary path for the fluid both when the buckling pin is mechanically deformed and when the support member retracts to the retracted position.

14. The control assembly of claim 13, wherein the support member comprises a support surface which pressingly contacts the second end of the buckling pin, and wherein the compressive force upon the buckling pin induces a retention force upon the support surface which counteracts the retraction force of the biasing member to retain the support member in the extended position when the pressure of the fluid is above the lower operational limit.

15. The control assembly of claim 14, wherein the retention force is established in relation to a coefficient of friction between the second end of the buckling pin and the support surface.

16. The control assembly of claim 14, wherein the support member further comprises a pin aperture adjacent the support surface, and wherein the second end of the buckling pin slides across the support surface and into the pin aperture as the support member moves from the extended position to the retracted position.

17. The control assembly of claim 13, wherein the body portion has a pin aperture axially-aligned with the buckling pin so that, when the support member is moved to the retracted position, the second end of the buckling pin extends into the pin aperture of the body portion.

18. The control assembly of claim 13, wherein the control assembly further comprises a keying member, which maintains desired alignment of the support member with the body portion as the support member moves from the extended position to the retracted position.

19. The control assembly of claim 13, wherein the biasing member comprises a spring.

20. The control assembly of claim 13, wherein the pressure of the fluid causes the valve assembly to respectively establish the secondary path after the buckling pin mechanically deforms and after the support member retracts to the retracted position.

* * * * *